United States Patent
Hsu et al.

(10) Patent No.: US 7,639,450 B2
(45) Date of Patent: Dec. 29, 2009

(54) FLUX SHUNT STRUCTURE FOR REDUCING RETURN POLE CORNER FIELDS IN A PERPENDICULAR MAGNETIC RECORDING HEAD

(75) Inventors: Yimin Hsu, Sunnyvale, CA (US); Quang Le, San Jose, CA (US); Roger William Wood, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 554 days.

(21) Appl. No.: 11/116,677

(22) Filed: Apr. 27, 2005

(65) Prior Publication Data

US 2006/0245108 A1 Nov. 2, 2006

(51) Int. Cl.
G11B 5/127 (2006.01)
(52) U.S. Cl. ..................................................... 360/125
(58) Field of Classification Search ............ 360/125.02, 360/125.03
See application file for complete search history.

(56) References Cited

U.S. PATENT DOCUMENTS

| | | | | |
|---|---|---|---|---|
| 4,317,148 | A | * | 2/1982 | Chi ........................ 360/125.22 |
| 4,489,484 | A | | 12/1984 | Lee .............................. 29/603 |
| 4,656,546 | A | | 4/1987 | Mallory ...................... 360/110 |
| 4,672,494 | A | | 6/1987 | Furuya et al. ............... 360/125 |
| 4,731,157 | A | * | 3/1988 | Lazzari ......................... 216/22 |
| 4,849,841 | A | | 7/1989 | Sokolik ....................... 360/119 |
| 4,935,832 | A | * | 6/1990 | Das et al. ..................... 360/112 |
| 5,075,956 | A | | 12/1991 | Das .............................. 29/603 |
| RE33,949 | E | * | 6/1992 | Mallary et al. .............. 360/110 |
| 5,196,976 | A | * | 3/1993 | Lazzari ..................... 360/318.1 |
| 5,345,354 | A | | 9/1994 | Ito et al. ...................... 360/121 |
| 5,408,373 | A | * | 4/1995 | Bajorek et al. ........... 360/244.3 |
| 5,414,783 | A | | 5/1995 | Bov, Jr. et al. .............. 382/320 |
| 5,530,776 | A | | 6/1996 | Bov, Jr. et al. .............. 382/320 |
| 5,543,989 | A | | 8/1996 | Westwood ................... 360/113 |
| 5,550,691 | A | * | 8/1996 | Hamiton ................... 360/246.1 |
| 6,477,002 | B1 | | 11/2002 | Mizoh ........................ 360/119 |
| 6,531,202 | B1 | * | 3/2003 | Litvinov et al. ............. 428/848 |
| 6,721,129 | B2 | | 4/2004 | Lam ........................... 360/119 |
| 6,728,065 | B2 | * | 4/2004 | Batra et al. ............ 360/125.03 |
| 6,785,092 | B2 | | 8/2004 | Covington et al. .......... 360/126 |

(Continued)

OTHER PUBLICATIONS

E. Leung, M. Hayashi, R. Leung, K. Ino, N. Matono, S. Takahashi, M. Fujita, "Writer Performance Improvement in MR Head With Oversized Trailing Poles Technique," Magnetics, IEEE Transactions on, vol. 34, Issue 4, Jul. 1998.

(Continued)

*Primary Examiner*—Mark Blouin
(74) *Attorney, Agent, or Firm*—Zilka-Kotab, PC

(57) ABSTRACT

A magnetic head for use in a perpendicular recording system having a novel shield structure that provides exceptional magnetic shielding from extraneous magnetic fields such as from a write coil, shaping layer or return pole of the write head. The magnetic head includes a write pole, a return pole and a magnetic shield that is magnetically connected with the return pole near the ABS and extends toward the write pole. The shield is formed with a notch at its edge closest to the write pole. The notch assures adequate physical, magnetic, and electrical separation between the write pole and the shield, while allowing un-notched portions of the shield to provide additional magnetic shielding.

22 Claims, 7 Drawing Sheets

U.S. PATENT DOCUMENTS

| | | | |
|---|---|---|---|
| 6,842,313 B1 * | 1/2005 | Mallary | 360/319 |
| 6,888,700 B2 * | 5/2005 | Litvinov et al. | 360/125.03 |
| 6,954,340 B2 * | 10/2005 | Shukh et al. | 360/317 |
| 7,002,775 B2 * | 2/2006 | Hsu et al. | 360/125.03 |
| 7,042,682 B2 * | 5/2006 | Hu et al. | 360/317 |
| 7,099,121 B2 * | 8/2006 | Parker et al. | 360/317 |
| 7,120,988 B2 * | 10/2006 | Le et al. | 29/603.07 |
| 7,265,941 B2 * | 9/2007 | Le et al. | 360/125.3 |
| 7,322,095 B2 * | 1/2008 | Guan et al. | 29/603.07 |
| 2002/0048126 A1 | 4/2002 | Shimazawa | 360/320 |
| 2002/0176214 A1 | 11/2002 | Shukh et al. | 360/317 |
| 2003/0021063 A1 | 1/2003 | Kuroda et al. | 360/125 |
| 2003/0117749 A1 | 6/2003 | Shukh et al. | 360/317 |
| 2003/0227714 A1 | 12/2003 | Parker et al. | 360/125 |
| 2004/0218312 A1 | 11/2004 | Matono | 360/317 |
| 2005/0068678 A1 | 3/2005 | Hsu et al. | 360/126 |
| 2005/0083605 A1 | 4/2005 | Hu et al. | 360/125 |

OTHER PUBLICATIONS

European Search Report from European Application No. 06251318.9 which was mailed on Jul. 14, 2006.

* cited by examiner

FLUX SHUNT STRUCTURE FOR REDUCING RETURN POLE CORNER FIELDS IN A PERPENDICULAR MAGNETIC RECORDING HEAD

FIELD OF THE INVENTION

The present invention relates to current perpendicular magnetic recording and more particularly to a novel magnetic shield design that eliminates data erasure due to extraneous fields such as from a write coil or shaping layer of the magnetic write head during the write process.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second read shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One problem that has arisen as a result of such perpendicular recording systems is that the magnetic medium is particularly susceptible to stray magnetic fields. Ideally all of the magnetic field picked up by the medium would come from the write pole, the resulting flux then passing through the soft underlayer of the medium to return to the return pole. In actuality, however, because the soft underlayer is so sensitive to magnetic fields, it is affected by magnetic fields from the write coil, and from magnetic fields coming directly from the shaping layer to the medium. The shaping layer, which will be described in more detail below, is a magnetic structure that channels magnetic flux to the write pole. In perpendicular recording designs, these magnetic fields from the coil and the shaping layer have been found to generate significant amount of flux concentrated at the corners of the return pole and/or the shields. When the write head is operated at high write currents, the fields under these corners are high and potentially can cause data erasure. The situation is worsened when the writing is performed at the presence of an external field.

This problem could be ameliorated by moving the write coil and the shaping layer away from the ABS, however, this would cause a loss of write head efficiency by making it difficult to produce a strong write field from the write pole at a reasonable write current. One attempt to overcome the problem of magnetic signal erasure from the coil and the shaping layer has been to provide a shield that extends from the return pole toward the write pole. Such a design is described in United States Patent Application US2003/0227714A1 entitled PERPENDICULAR MAGNETIC RECORDING HEAD HAVING A REDUCED FIELD UNDER THE RETURN POLE AND MINIMAL EDDY CURRENT LOSSES. While the design described in the above identified patent application does help to lessen the effects of such unwanted fields, it has been found that the soft underlayer is so sensitive that signal erasure might still occur, depending on the media property and the strength of external fields.

Therefore, there is a strong felt need for a design for a perpendicular writer to overcome the signal erasure problem that occurs as a result of unwanted magnetic fields such as those from the write coil and the shaping layer. Such a design would preferably allow the coil and shaping layer to be located near enough to the ABS to provide excellent magnetic writer performance, while still avoiding data erasure.

SUMMARY OF THE INVENTION

The present invention provides magnetic write head for perpendicular recording that has novel shield structure that provides excellent protection against inadvertent erasure of data due to extraneous magnetic fields from portions of the write head such as the write coil, return pole or shaping layer. A write head according to an embodiment of the invention includes a magnetic write pole having an ABS end and a back end, a return pole having an ABS end and a back end, the return pole being magnetically connected with the write pole, and a magnetic shield that is magnetically connected with the ABS end of the return pole and extends toward the write pole. The magnetic shield has a notch which ensures sufficient physical and magnetic separation from between the write pole and the shield while also allowing the un-notched portions of the shield to extend further toward or alongside the write pole.

The un-notched portions of the write pole may extend up to the level of the bottom or leading edge of the write pole, and may extend beyond the level of the leading edge of the write pole to extend up to a level adjacent to the sides of the write pole. The un-notched portions of the shield may even extend beyond the top or trailing edge of the write pole.

In an alternate embodiment of the invention, the shield may be formed with an aperture into which the ABS end of the write pole extends, so that the shield actually surrounds the ABS end of the write pole.

The notch or the aperture may be formed such that a desired spacing is maintained between the leading edge of the write pole and the shield. This spacing may be 0.4 um-3.0 um, or may be some distance greater than 10 times of the distance from the write pole ABS surface to the top surface of the soft underlayer. A distance of 2-10 um or greater than 3 um may be maintained between the shield and the sides of the write pole.

The shield construction of the present invention advantageously absorbs magnetic fields from items such as the coil, return pole, shaping layer or other structures of the magnetic head, assuring that only field from the write pole affects the magnetic medium.

The shield construction provides this excellent magnetic shielding while also providing sufficient spacing between the write pole and the shield, thereby preventing flux leakage to between the write pole and the shield, which would degrade magnetic performance.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
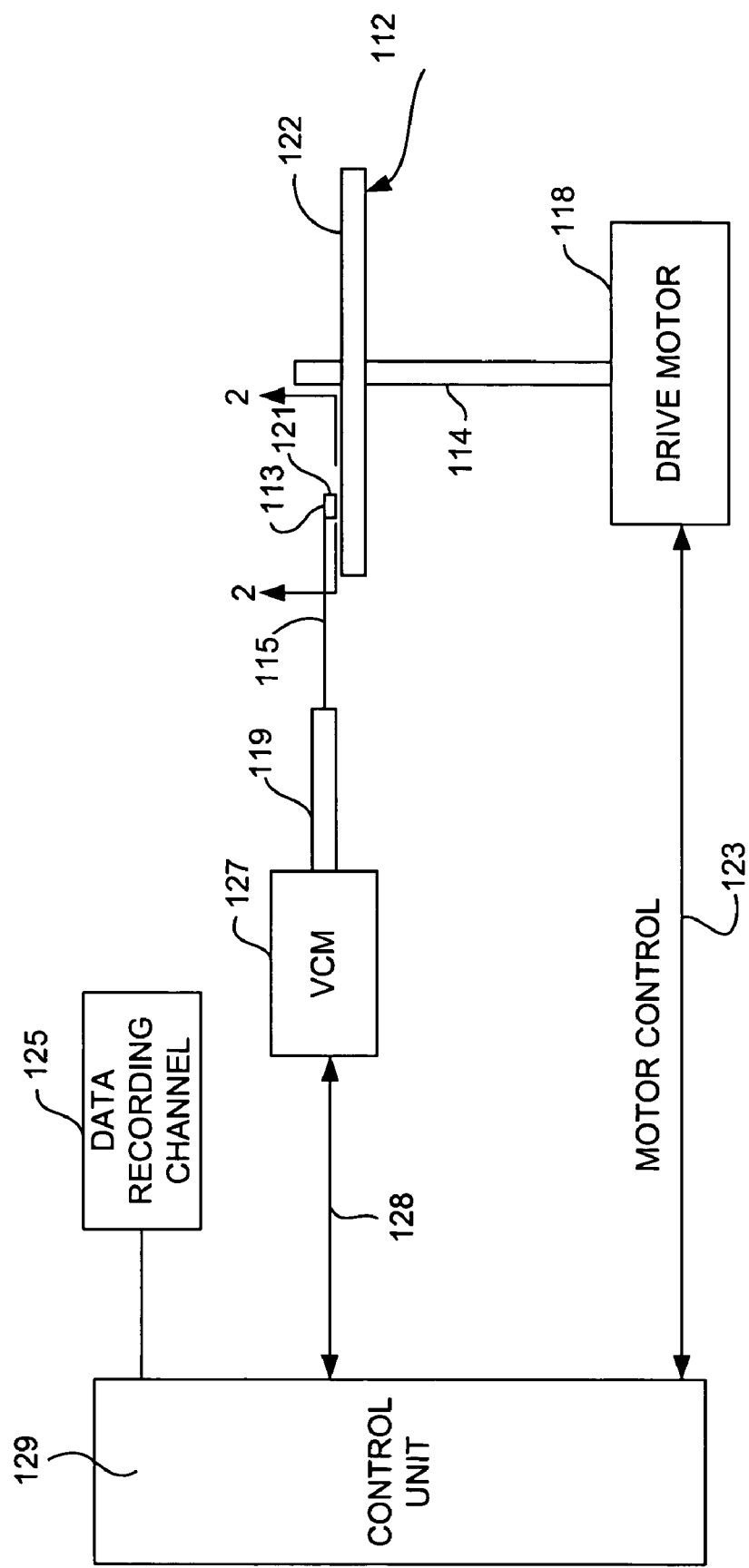
FIG. 1 is a schematic illustration of a disk drive system in which the invention might be embodied.
Figure 2:
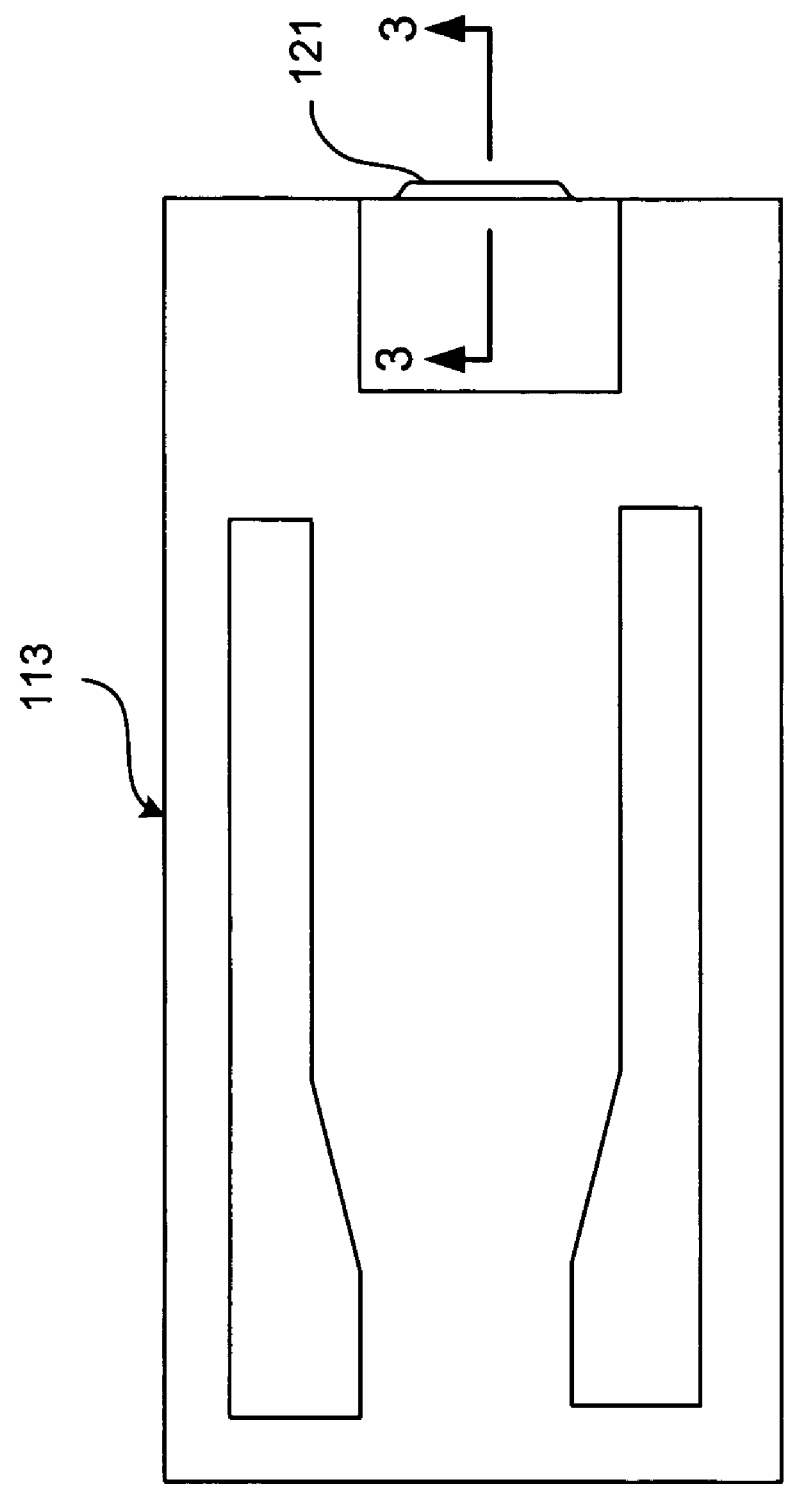
FIG. 2 is an ABS view of a slider, taken from line 2-2 of FIG. 1, illustrating the location of a magnetic head thereon.

Referring now to FIG. 1, there is shown a disk drive 100 embodying this invention. As shown in FIG. 2, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 217 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustrations of FIGS. 1 and 2 are for representation purposes only. It should be apparent that disk storage systems may contain a large number of disks and actuators, and each actuator may support a number of sliders.

Figure 3:
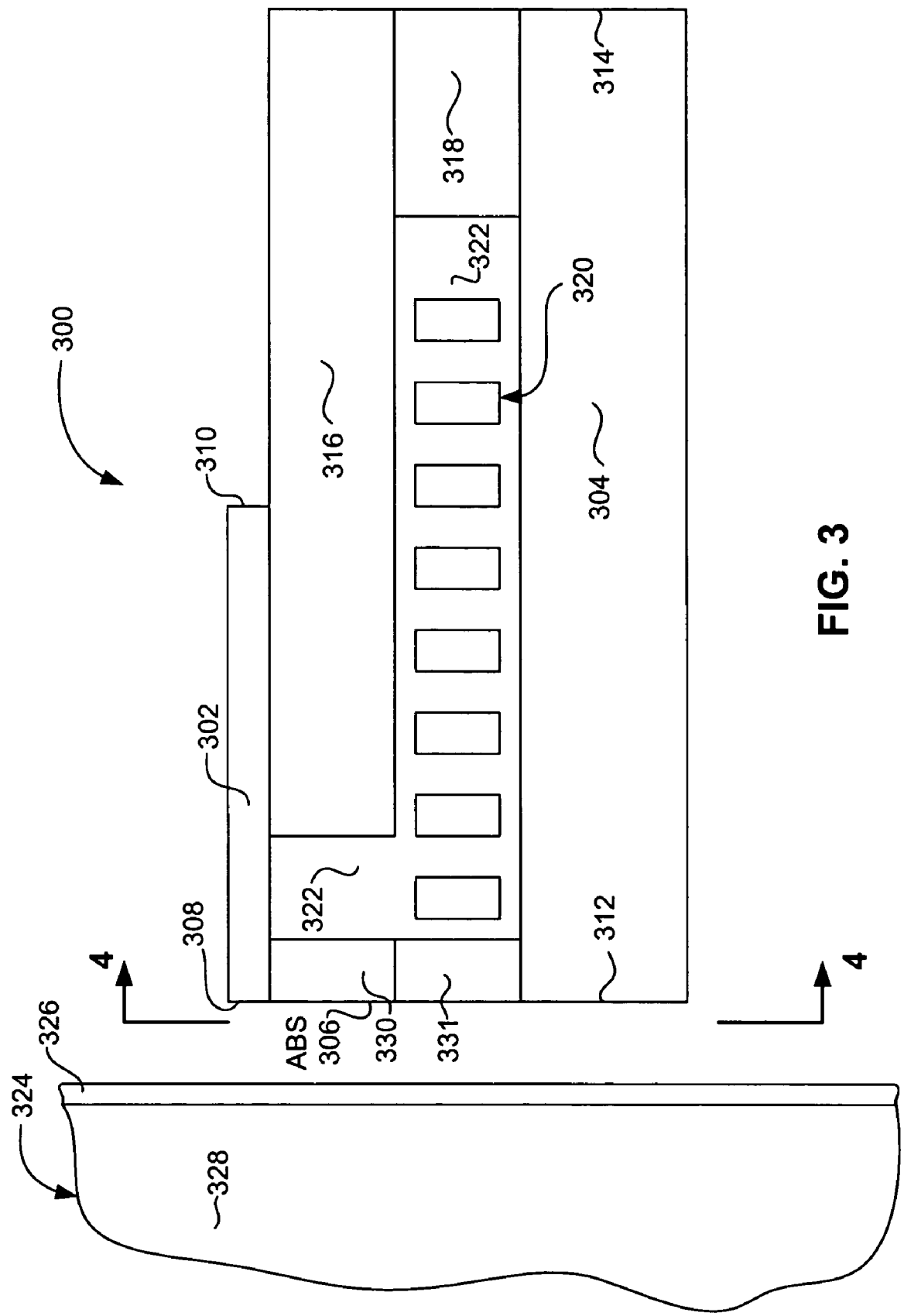
FIG. 3 is a cross sectional view, taken from line 3-3 of FIG. 2 and rotated 90 degrees counter clockwise, of a magnetic write head according to an embodiment of the present invention.

With reference now to FIG. 3, a magnetic write head 300 according to an embodiment of the present invention includes a write pole 302 and a return pole 304. The write pole and return pole 302, 304 each extend to the air bearing surface (ABS) 306. Therefore, the write pole has an ABS end 308 and a back end 310. Similarly, the return pole has an ABS end 312 and a back end 314. A shaping layer 316 is magnetically connected with the write pole 302 and channels magnetic flux to the write pole 302. A magnetic pedestal or back gap layer 318 magnetically connects the shaping layer 316 with the return pole 304 at a back gap location located away from the ABS 306. A pedestal 331 may also be provided at the ABS end of the return pole, extending toward the write pole. The shaping layer 316, back gap 318 and return pole 304 can be constructed of a magnetic material (preferably a material capable of being electroplated) such as NiFe or some other magnetic material. The write pole 302 is preferably constructed of a high magnetic moment, saturation (high Bsat) material such as CoFe or $Ni_{50}Fe_{50}$.

With continued reference to FIG. 3, the magnetic write head includes an electrically conductive, non-magnetic coil 320, preferably having multiple turns, a portion of which passes through the write head 300 between the shaping layer 316 and write pole 302 and the return pole 304. The coil 320 can be constructed of, for example Cu and is electrically insulated from the magnetic structures of the write head 300 by an insulation layer 322, which can be for example one or more layers of Alumina $Al_2O_3$, silicon dioxide $SiO_2$, hard baked photoresist of some other material or combination of materials.

When current is conducted through the coil 320, a magnetic field is generated, causing a magnetic flux to flow through the return pole 304, back gap 318, shaping layer 316 and write pole 302. An adjacent magnetic medium 324 having a thin magnetically hard surface layer 326 and a magnetically soft underlayer 328 completes the magnetic circuit. Field emitted from the write pole 302 causes generates a magnetic flux in the magnetic medium which passes through the soft under layer 328 and returns to the return pole 312. The magnetic field from the write pole 302 is strong and focused and locally magnetizes the high moment surface layer 326 of the medium 324. After passing through the magnetically soft under layer 328 the magnetic flux returns to the return pole where it is sufficiently spread out and weak that it does not erase signals produced by the write pole 302.

As discussed above in the Background of the Invention prior art write head designs suffered from the problem that extraneous magnetic fields, such as those from the write coil 320 and shaping layer 316 have been sufficiently strong to erase previously recorded magnetic data, especially at the presence of external stray fields. While moving the coil 320 and shaping layer 316 away from the ABS 306 would alleviate such a problem, doing so would result in an unacceptable loss of head performance. The coil 320 must be located close enough to the ABS 306 to provide a sufficiently strong write field from the write head 302. Similarly, moving the shaping layer 316 away from the ABS would not allow sufficient magnetization of the write pole 302 at the ABS end 308.

The present invention provides a novel magnetic shield or "flux catcher" design 330 that prevents magnetic fields, such as those from the write coil 320 shaping layer 316 or return pole 304, from reaching or affecting the magnetic medium 324. The shield 330 absorbs magnetic fields from the write coil 320, shaping layer 316 and return pole 304, drawing such fields back into the magnetic structure of the write head so that they will not adversely affect the magnetic medium.

Figure 4:
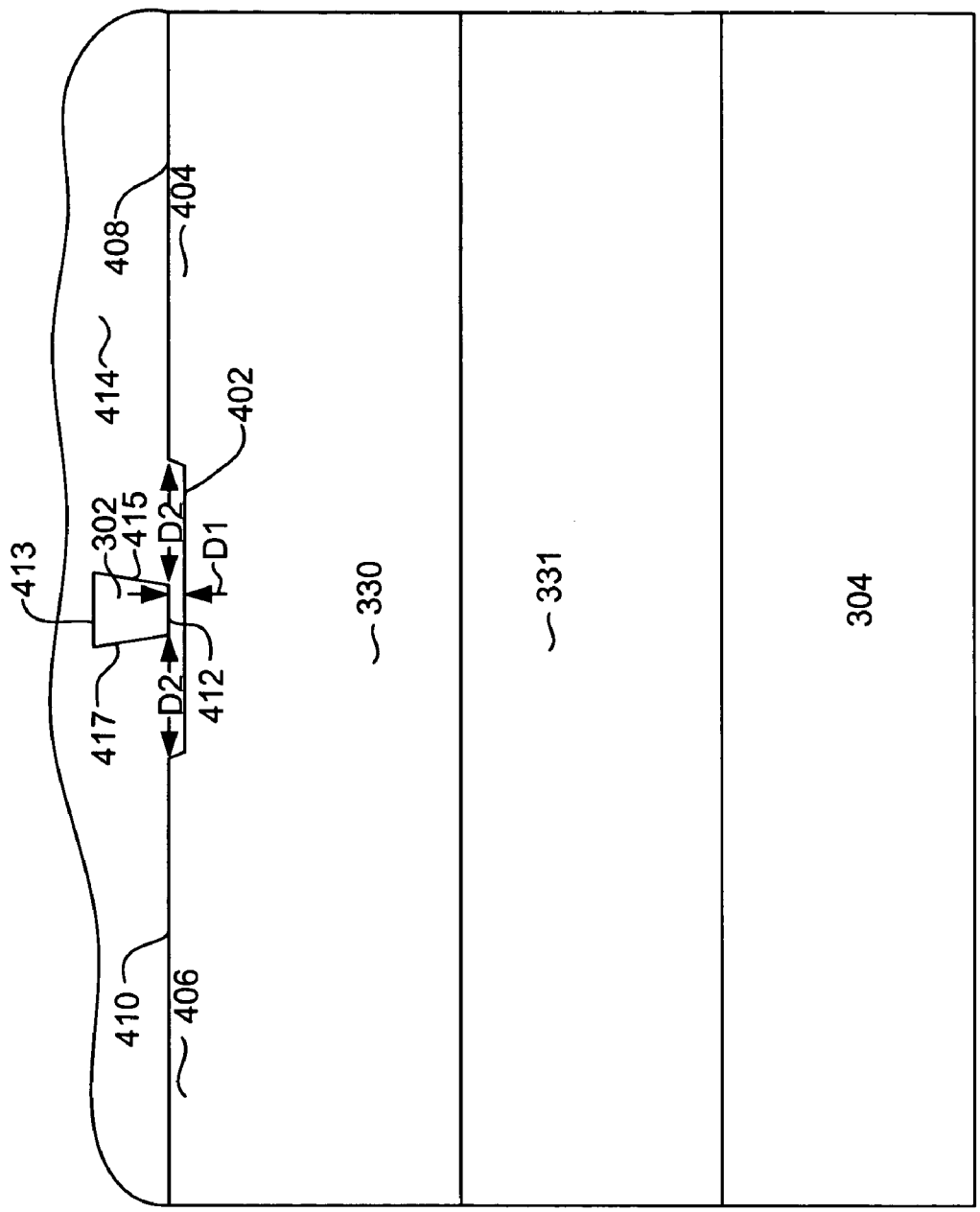
FIG. 4 is an ABS view, taken from line 4-4 of FIG. 4, shown enlarged, of the magnetic write head of FIG. 3.

With reference now of FIG. 4, an ABS view of the flux catcher shield 330 better illustrates its novel features. The shield 330, which can be constructed of many magnetic materials and is preferably constructed of NiFe, may be constructed on a magnetic pedestal 331, which is magnetically connected to the return pole 304. In order to ensure efficient performance of the write pole 302, a certain minimum clearance must be provided between the shield 330 and the write pole 302. If the shield 330 were to be constructed too close to the write pole 302, the field from the write pole 302 would shunt directly to the shield 330 rather than to the medium 324 (FIG. 3) as desired. However, as discussed above, significant shielding is needed to prevent fields from the coils 330 and other structures from magnetizing the medium 328.

In order to provide the necessary shielding and also provide the necessary spacing between the shield 330 and the write pole 302, a notch 402 is provided adjacent to the write pole 302. The write pole 302 as shown in FIG. 4 has a leading edge 412, a trailing edge 413, and first and second laterally opposed sides 415, 417. The write pole 302 also preferably has a trapezoidal shape, which is advantageous in avoiding adjacent track writing when the head is at a skewed angle such as at outer and inner tracks on the disk 324. However, such a trapezoidal write head 302 is not a requirement to practice the invention. The notch 402 provides a desired minimum spacing D1 between the leading edge 412 of the write pole 302 and shield 330, which spacing may be for example 0.4 um to 3.0 um and is preferably at least 10 times the distance from the ABS surface of the write pole to the top surface of the soft underlayer 328 of the magnetic medium 324. The desired minimum spacing D2 between the sides 415, 417 of the write pole 302 and shield 330 can be more relaxed and is preferably about 3 to 10 um. It can also be seen that the notch 402 has been illustrated as having a trapezoidal shape to complement the trapezoidal shape of the write head, however, the notch 402 could have many other shapes, such as but not limited to: rectangular, semicircular, irregular or elliptical.

With continued reference to FIG. 4, the notch 402 results in first and second extended or un-notched remainder portions 404, 406 of the shield 330. These remainder portions can extend toward, but not completely to the level of write pole 302, but preferably extend at least to the level of the write pole 302. As shown in FIG. 4, in the presently described embodiment the uppermost (or trailing) edges 408, 410 of the un-notched portions 404, 406 of the shield 330 extend to a level that is coplanar with the leading edge 412 of the write pole 302. A non-magnetic, electrically insulating material 414, such as $Al_2O_3$ or some other material, surrounds the write pole 302, electrically insulating and magnetically isolating the write pole 302 from the shield 330.

Figure 5:
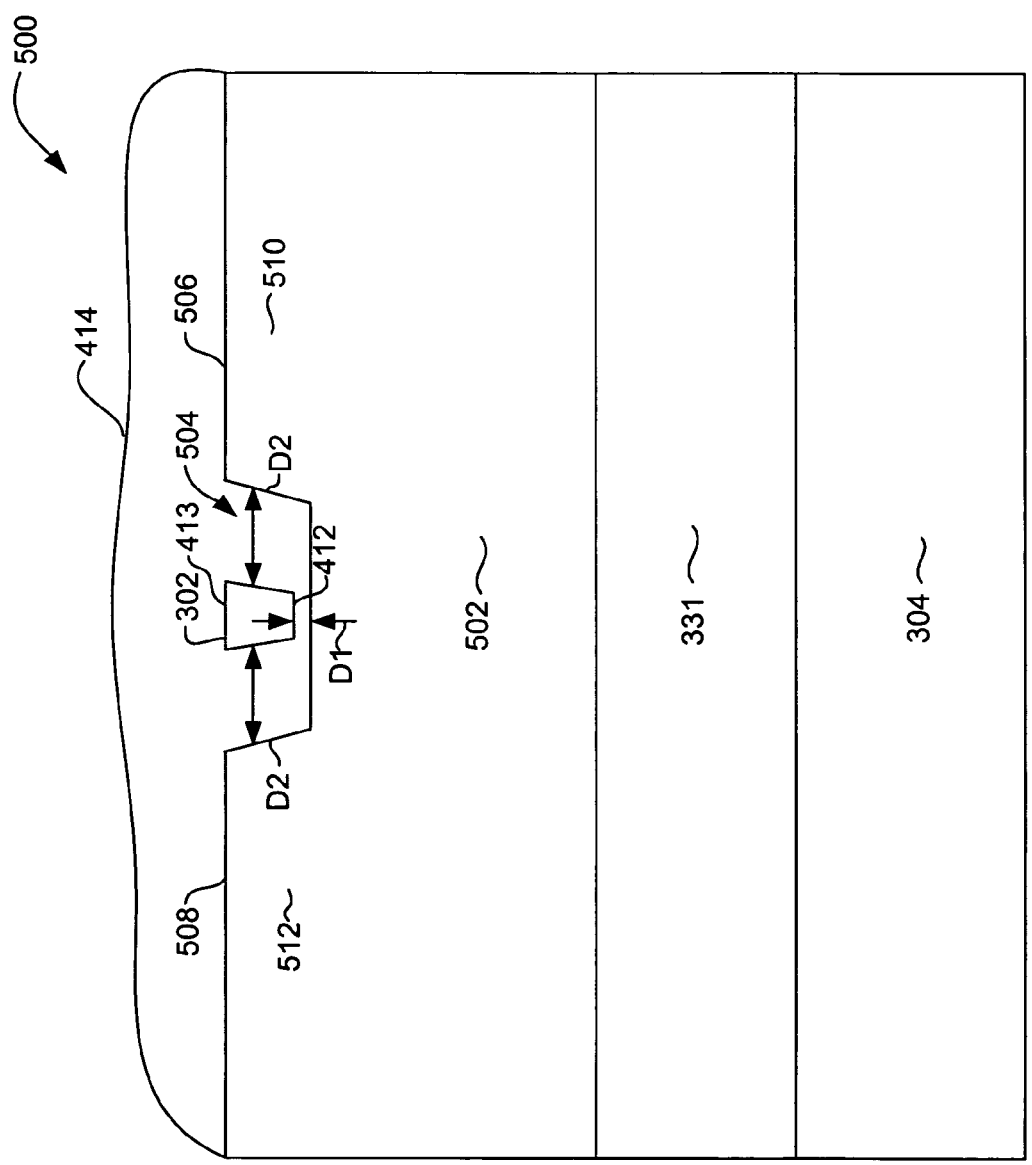
FIG. 5 is a view, similar to that of FIG. 4 of a magnetic structure according to an alternate embodiment of the invention.

With reference now to FIG. 5, another possible embodiment includes a shield 502 having a deeper notch 504. The upper edges 506, 508 of the un-notched portions 510, 512 extend to the trailing edge of the 413 of the write pole 302. This embodiment provides additional shielding protection over that described with reference to FIG. 4, by shielding areas laterally disposed at either side of the write head 302. Again, the desired spacing D1 and D2 is preferably maintained between the write pole 302 and the shield 502, and while the notch 504 is shown as being trapezoidal, it could be constructed in one of many different shapes.

While FIG. 4 shows the un-notched portions 404, 406 extending to the leading edge 412 of the write pole 302, and FIG. 5 shows the un-notched portions 404, 406 as extending to the same level as the trailing edge 413 of the write pole 302, these levels are not requirements to practice the invention. For example, the top edges 506, 508 of the un-notched portions 510, 512 could extend to a level that is somewhere between levels of the trailing 513 and leading 412 surfaces of the write pole 302.

Figure 6:
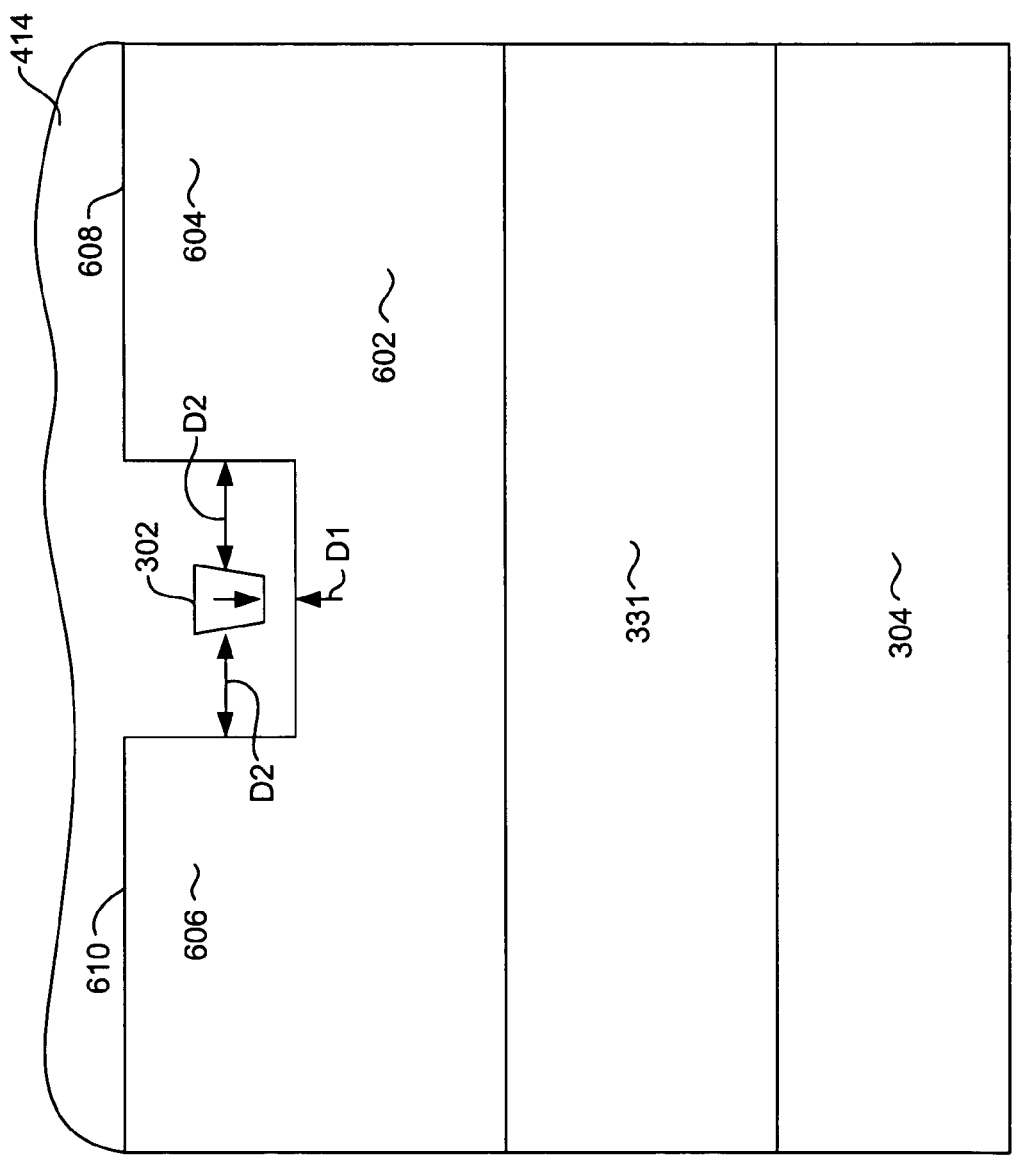
FIG. 6 is a view, similar to that of FIG. 4 of a magnetic structure according to another possible embodiment of the invention.

Furthermore, as illustrated in FIG. 6, a shield 602 can be constructed having un-notched portions 604, 606 with upper edges 608, 610 that extend significantly beyond the trailing edge 413 of the write pole 302. Whether constructed as described with reference to FIG. 4, 5 or 6, the amount by which the un-notched portions 604, 606 extend is preferably determined by design requirements such as the amount of shielding needed in a particular head design to avoid unwanted writing and signal erasure.

Figure 7:
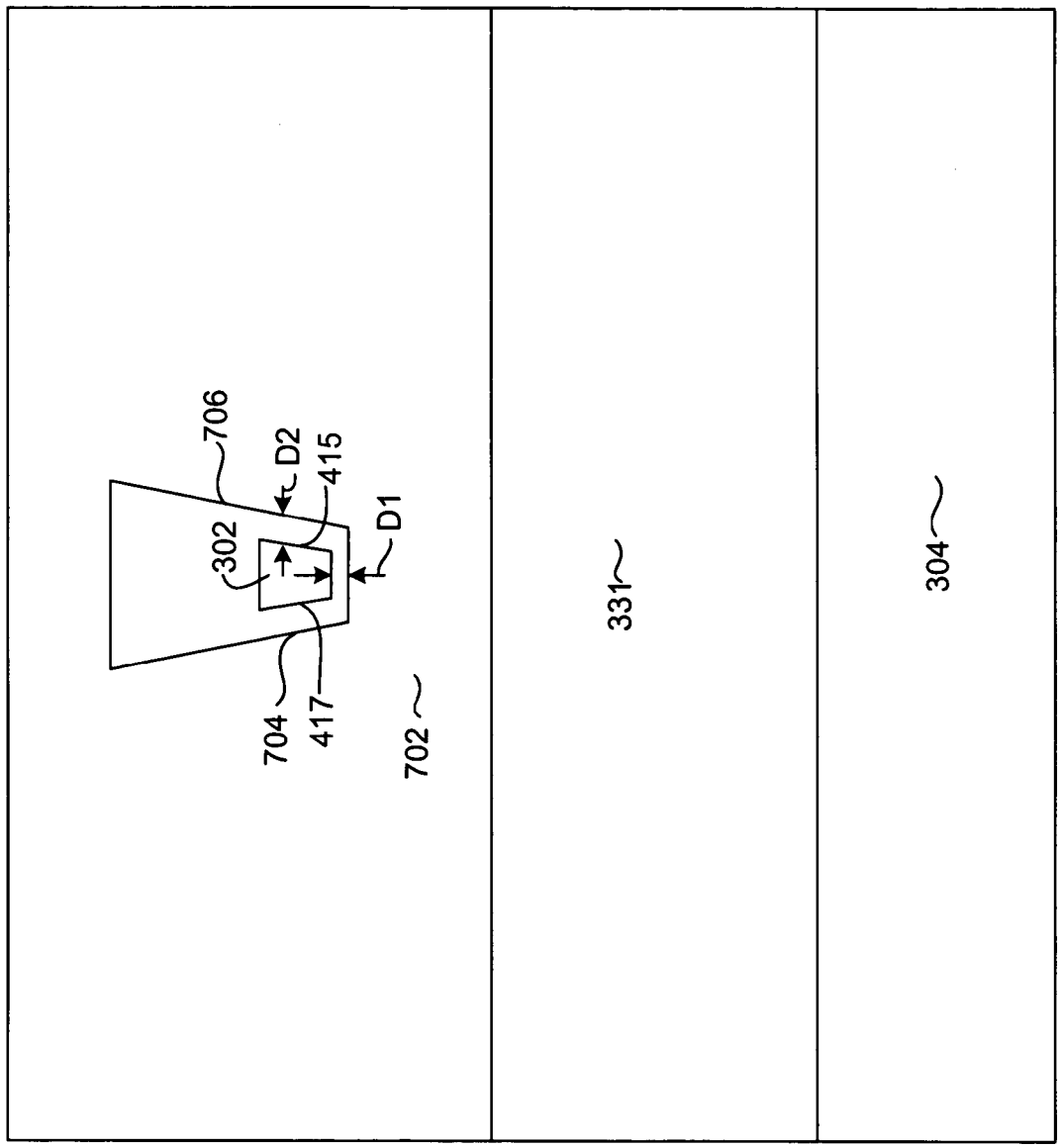
FIG. 7 is a view, similar to that of FIG. 4 of a magnetic structure according to yet another possible embodiment of the invention.

With reference to FIG. 7, another embodiment of the present invention includes a shield 702 that completely surrounds the write pole 302. The shield 702 extends beyond the write pole 302 and has a void or aperture 704 into which the write pole protrudes. Although the aperture 704 is shown as having a trapezoidal shape to match the shape of the write pole 302, the aperture 704 could actually be one of many shapes such as oval, circular, rectangular, irregular or some other shape. A non-magnetic, dielectric material 706 electrically insulates and magnetically isolates the write pole 302 from the shield 702. As with the other embodiments, the sides 415, 417 of the write pole 302 are preferably separated from the shield by a distance D2 which can be for example 2-10 um and the leading edge 412 of the write pole is separated from the shield by a distance of 0.4 to 3.0 um or at least 10 times the distance between the ABS surface of the write pole and the soft underlayer 328 of the magnetic medium 324 during operation.

While various embodiments have been described above, it should be understood that they have been presented by way of example only, and not limitation. Other embodiments falling within the scope of the invention may also become apparent to those skilled in the art. For example although the invention has been described as being incorporated into a perpendicular recording system and would be particularly suited to use in such a system, the invention may be practiced in any magnetic recording system including a longitudinal magnetic recording system. Thus, the breadth and scope of the invention should not be limited by any of the above-described exemplary embodiments, but should be defined only in accordance with the following claims and their equivalents.

What is claimed is:

1. A magnetic write head having an air bearing surface (ABS), comprising:
   a write pole having an ABS end extending to the ABS, a leading edge, a trailing edge opposite the leading edge and first and second laterally opposed sides;
   a return pole having an ABS end extending to the ABS, the return pole being connected with the write pole at a location removed from the ABS;
   a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending toward the leading edge of the write pole and terminating at a trailing edge;
   a notch formed in the trailing edge of the magnetic shield at a location near the write pole; and
   the trailing edge of the magnetic shield forming first and second un-notched portions extending laterally from the notch;
   wherein the notch is configured to maintain a distance of 0.4-3.0 um between the shield and the leading edge of the write pole.

2. A magnetic head as in claim 1, wherein the trailing edge of the write pole defines a first plane and wherein the un-notched portion of the shield extends at least to the first plane.

3. A magnetic head as in claim 1, wherein the leading edge of the write pole defines a first plane and wherein the un-notched portions of the shield extend beyond the first plane.

4. A magnetic head as in claim 1, wherein:
   the leading edge of the write pole defines a first plane;
   the trailing edge of the write pole defines a second plane; and
   the first and second un-notched portions terminate at a location between the first and second planes.

5. A magnetic head as in claim 1, wherein the notch is configured to maintain a distance of 3-10 um between the un-notched portions of the shield and the first and second laterally opposed sides of the write pole.

6. A magnetic write head having an air bearing surface (ABS), comprising:
   a write pole having an ABS end extending to the ABS, a leading edge, a trailing edge opposite the leading edge and first and second laterally opposed sides;
   a return pole having an ABS end extending to the ABS. the return pole being connected with the write pole at a location removed from the ABS;

a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending toward the leading edge of the write pole and terminating at a trailing edge;

a notch formed in the trailing edge of the magnetic shield at a location near the write pole; and the trailing edge of the magnetic shield forming first and second un-notched portions extending laterally from the notch;

wherein the notch is configured to maintain a distance of at least 3 um between the un-notched portions of the shield and the first and second laterally opposed sides of the write pole.

7. A magnetic write head having an air bearing surface (ABS), comprising:
a write pole having an ABS end extending to the ABS, a leading edge, a trailing edge opposite the leading edge and first and second laterally opposed sides;
a return pole having an ABS end extending to the ABS, the return pole being connected with the write pole at a location removed from the ABS;
a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending toward the leading edge of the write pole and terminating at a trailing edge;
a notch formed in the trailing edge of the magnetic shield at a location near the write pole; and
the trailing edge of the magnetic shield forming first and second un-notched portions extending laterally from the notch;
wherein the notch is configured with a shape that is complimentary to the write pole and maintains a constant distance D1 between the leading edge of the write pole and the shield maintains a distance D2 between the sides of the write pole and the un-notched portions of the shield, and wherein D1 is 0.4-3.0 um and D2 is 3-10 um.

8. A magnetic head as in claim 1, wherein the notch has a trapezoidal configuration.

9. A magnetic head as in claim 1, wherein the notch has a rectangular configuration.

10. A magnetic head as in claim 1, wherein the notch has a semi-circular configuration.

11. A magnetic head as in claim 1, wherein the notch has an elliptical configuration.

12. A magnetic write head, comprising:
a write pole having an ABS end extending to an air bearing surface (ABS), a trailing edge, a leading edge opposite the trailing edge, and first and second laterally opposed sides;
a return pole having an ABS end extending to the ABS, the return pole being magnetically connected with the write pole in a region removed from the ABS; and
a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield surrounding the write pole at the ABS end of the write pole, the magnetic shield being separated from the write pole by a non-magnetic material;
wherein the shield is separated from the leading edge of the write pole by a distance of 0.4-3.0 um.

13. A magnetic write head, comprising:
a write pole having an ABS end extending to an air bearing surface (ABS), a trailing edge, a leading edge opposite the trailing edge, and first and second laterally opposed sides;
a return pole having an ABS end extending to the ABS, the return pole being magnetically connected with the write pole in a region removed from the ABS; and
a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield surrounding the write pole at the ABS end of the write pole, the magnetic shield being separated from the write pole by a non-magnetic material;
wherein the shield is separated from the first and second sides of the write pole by a distance of 3-10 um.

14. A magnetic head as in claim 12 further comprising a non-magnetic, electrically insulating material disposed between the write pole and the shield.

15. A magnetic write head, comprising:
a write pole having an ABS end extending to an air bearing surface (ABS), a trailing edge, a leading edge, and first and second laterally opposed sides;
a return pole having an ABS end extending to the ABS, the return pole being magnetically connected with the write pole in a region remove from the ABS; and
a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending beyond the write pole; and
an aperture formed in the shield, the ABS end of the write pole extending into the aperture, the write pole being separated from the shield;
wherein the aperture is configured to maintain a distance of 0.4-3.0 um between the write pole and the shield within the aperture.

16. A magnetic write head, comprising:
a write pole having an ABS end extending to an air bearing surface (ABS), a trailing edge, a leading edge, and first and second laterally opposed sides;
a return pole having an ABS end extending to the ABS, the return pole being magnetically connected with the write pole in a region remove from the ABS; and
a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending beyond the write pole; and an aperture formed in the shield, the ABS end of the write pole extending into the aperture, the write pole being separated from the shield;

wherein the aperture is configured to provide a separation of 3-10 um between the shield and the first and second sides of the write pole.

17. A magnetic head comprising:

a slider having an end and an air bearing surface (ABS);

a magnetoresistive sensor formed on the end of the slider; and a magnetic write head formed on the end of the slider, the magnetic write head comprising:

a write pole having an ABS end extending to the ABS, a trailing edge, a leading edge opposite the trailing edge, and first and second laterally opposed sides;

a return pole having an ABS end extending to the ABS, the return pole being magnetically connected with the write pole in a region removed from the ABS; and a magnetic shield, the magnetic shield being a separate structure from the return pole, the entire magnetic. shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending toward the write pole and terminating at an upper edge;

a notch formed in the upper edge of the magnetic shield; and the upper edge of the magnetic shield forming first and second un-notched portions at first and second sides of the notch;

wherein the notch is configured to maintain a distance of 0.4-3.0 um between the shield and the leading edge of the write pole.

18. A magnetic head comprising:

a slider having an end and an air bearing surface;

a magnetoresistive sensor formed on the end of the slider; and a magnetic write head formed on the end of the slider, the magnetic write head comprising:

a write pole having an ABS end, extending to the ABS;

a return pole having an ABS end extending to the ABS, the return pole being magnetically connected with the write pole, in a region removed from the ABS; and a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending beyond the write pole and surrounding the write pole at the ABS end of the write pole, the magnetic shield being separated from the write pole by a non-magnetic material;

wherein the shield is separated from the leading edge of the write pole by a distance of 0.4-3.0 um.

19. A magnetic head comprising:

a slider having an end and an air bearing surface;

a magnetic magnetoresistive sensor formed on the end of the slider; and a magnetic write head formed on the end of the slider, the magnetic write head comprising:

a write pole having an ABS end and a back end;

a return pole having an ABS end, the return pole being magnetically connected with the write pole in a region removed from the ABS; and a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending beyond the write pole; and an aperture formed in the shield, the ABS end of the write pole extending into the aperture, the write pole being separated from the shield by a non-magnetic material;

wherein the shield is separated from the leading edge of the write pole by a distance of 0.4-3.0 um.

20. A magnetic data recording system, comprising a magnetic medium;

an actuator;

a slider connected with the actuator for movement adjacent to a surface of the magnetic medium, the slider having an air bearing surface (ABS); and a write head connected with the slider, the write head comprising:

a write pole having an ABS end extending to the ABS;

a return pole having an ABS end extending to the ABS, the return pole being magnetically connected with the write pole; and a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending toward the write pole and terminating at an upper edge;

a notch formed in the upper edge of the magnetic shield; and the upper edge of the magnetic shield forming first and second un-notched portions at first and second sides of the notch;

wherein the notch is configured to maintain a distance of 0.4-3.0 um between the shield and the leading edge of the write pole.

21. A magnetic data recording system, comprising a magnetic medium;

an actuator;

a slider connected with the actuator for movement adjacent to a surface of the magnetic medium, the slider having an air bearing surface (ABS); and a write head connected with the slider, the write head comprising:

a write pole having an ABS end;

a return pole having an ABS end, the return pole being magnetically connected with the write pole at a region removed from the ABS; and a magnetic shield, the magnetic shield being a separate structure from the return pole, the entire magnetic shield having a height measured from the ABS that is much smaller than a height of the return pole as measured from the ABS, at least a portion of the magnetic shield being disposed between the return pole and the write pole, the magnetic shield being magnetically connected with the return pole at the ABS end of the return pole, the magnetic shield extending toward and surrounding the ABS end of the write pole, and being separated from the ABS end of the write pole by a non-magnetic material;

wherein the shield is separated from the leading edge of the write pole by a distance of 0.4-3.0 um.

22. A magnetic data recording system, comprising a magnetic medium;

an actuator;

a slider connected with the actuator for movement adjacent to a surface of the magnetic medium, the slider having an air bearing surface (ABS); and a write head connected with the slider, the write head comprising:

a write pole having an ABS end extending to the ABS;

a return pole having an ABS end extending to the ABS, the return pole being magnetically connected with the write pole in a region removed from the write pole; and a magnetic shield, the magnetic shield being a separate structure from the return pole, the entire magnetic shield having a height measured from the ABS that is much smaller than a height of the return pole as measured from the ABS. at least a portion of the magnetic shield being disposed between the return pole and the write pole, the magnetic shield being magnetically connected with the return pole at the ABS end of the return pole; and an aperture formed in the magnetic shield, the ABS end of the write pole extending into the aperture, the ABS end of the write pole being separated from the magnetic shield by a non-magnetic material;

wherein the shield is separated from the leading edge of the write pole by a distance of 0.4-3.0 um.

* * * * *